170X
2 Sheets—Sheet 1.
A. WHITTEMORE.
Machine for Manufacturing Sheet Cards.
Patented June 5, 1797.
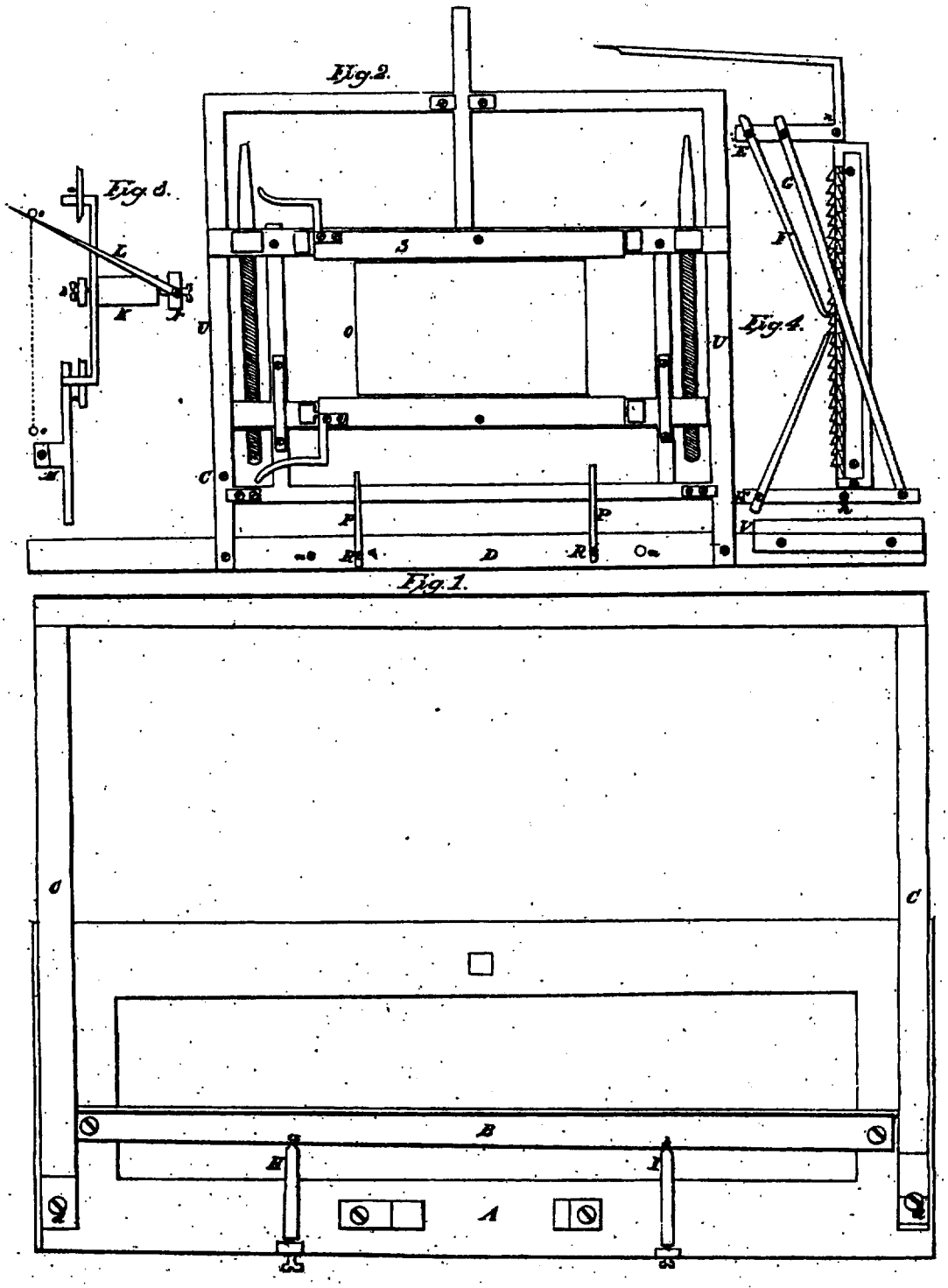

170X
2 Sheets—Sheet 2.
A. WHITTEMORE.
Machine for Manufacturing Sheet Cards.
Patented June 5, 1797.
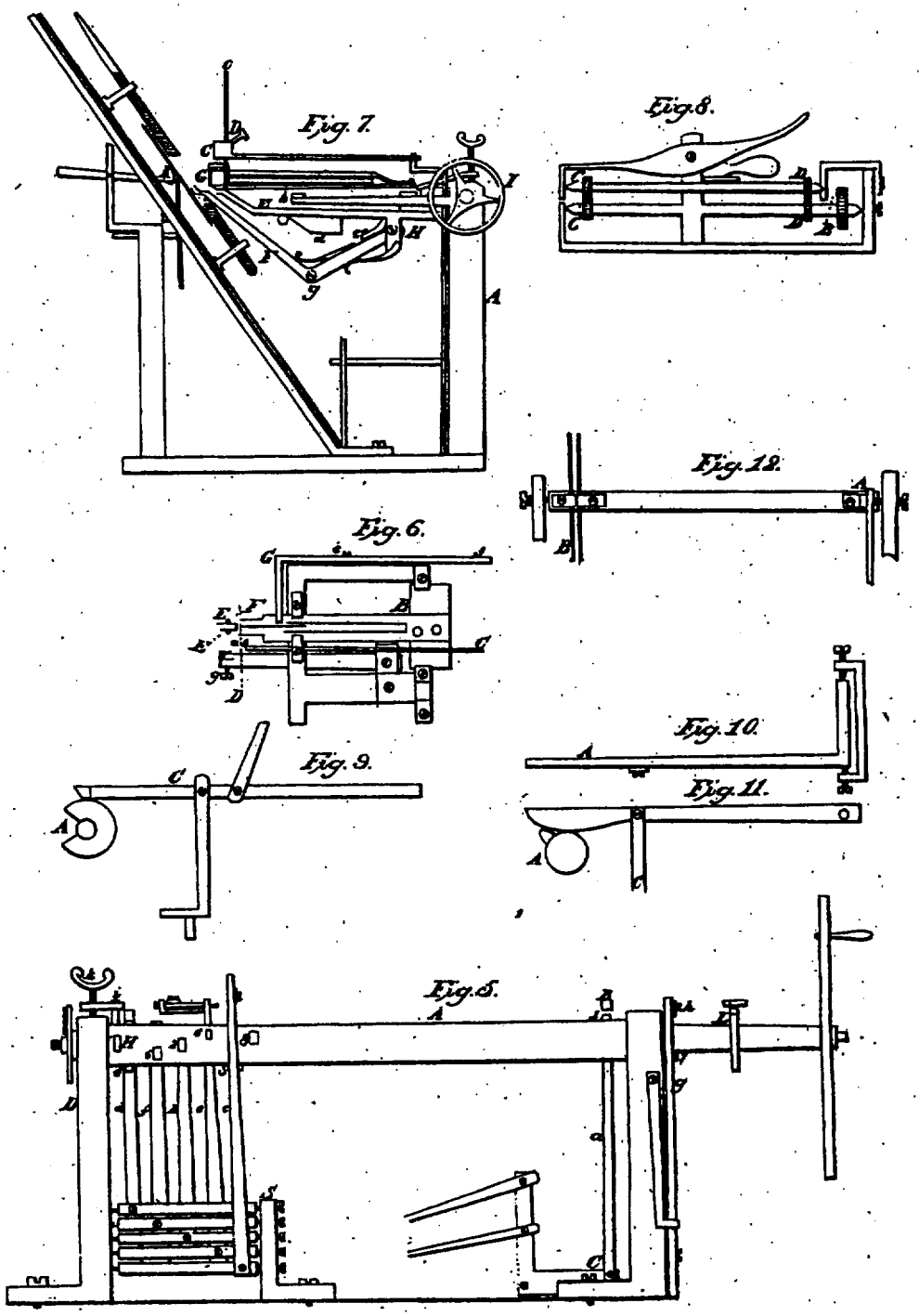

170X

June 5 1797

The Schedule referred to in these Letters Patent and making part of
the same, containing a description in the words of the said Amos Whit
temore himself, of an improvement in manufacturing cards..

A general specification of a machine for manufacturing sheet-
cards, suitable for wool or cotton cards, hatters cards, clothiers jacks, &
cards of every kind, size and denomination. This machine is put
in motion by a cylinder, on which are a number of knobs to give
the different motions. This cylinder may be turned by hand or other
power. On one end of the cylinder is a balance wheel with two, or
more arms, in one of the arms is a handle to turn it, on the other end
is a section wheel which plays into a pinion which turns two rollers,
which roll the wire into the former the proper lengths immediately
after a crowner (so called) is let off by a knob in the cylinder, and
forced up by a spring against the wire, so rolled into the former, and
holds it against the head, while the shears forced up by another knob,
cuts the wire off. A pricker is forced up by another knob, & pricks
two holes in the leather and falls back, while the wings forced up by
another knob, form the wire into a staple. Around the head a
conductor is let off by a space in the cylinder and is forced up by a
spring to its proper place to conduct the wire or staple into the leather
which is held in the carriage and extended by screws so as to be tight.
Immediately the whole apparatus for forming the wire is forced forward
and places the wire or staple into the leather and holds it until the
crooker which is on the other side of the leather, and moved by an-
other knob, forces the points of the wire or staple down over a sta-
tionary piece placed the same side of the leather with the crooker
which completes the wire, immediately the head is lifted up by
another knob, the crowner advances further forward and sets the
wire [illegible] up to the leather, then the apparatus which forms the wire
and crowner [illegible] back [illegible] to their place and receive another wire.
While the wire is rolling into the former, the carriage is moved by a
dog taking one tooth in a toothed rack, which dog is moved by anotheir knobs on the cylinder, and moves the carriage and leather to re-
ceive another wire or staple, it continues on until it goes neat through
the card or sheet lengthwise. The instant this dog is raised and
held up by a piece which is governed by a spring, and a straight
piece which gives the length of the card or sheet, another dog at the
opposite end of the machine falls into another toothed rack, & moves
the carriage and sheet back in the same manner it was carried
forward; this dog is moved by the same knobs which moves the first
mentioned dog, by being connected with it; at the same time these
dogs shift, another dog which is moved by a small wheel on the
end of the cylinder, being connected with a piece, which falls into
a blank or space in the small wheel, by which means the dog takes
one tooth in a rag wheel, which is placed on an arbour above the
small wheels, on which arbour are two small wheels, on which are
two chains or straps, which are confined to the carriages or pieces which
the carriage slides on; the piece connected with the dog, rises im-
mediately as the small wheel on the first mentioned arbour, revolves
round, and forces the dog, to move the rag wheel, and winds the chains
or straps, which raises the carriage and leather sufficiently for ano-
ther row of wires to be set; it holds the rag wheel in the same place un-
til the row of wires be full; this piece which is connected with the
dog which moves the rag wheel is also connected with another piece un-
der it which rests and slides on a straight piece, the same length
of the straight piece that gives the length of the card or sheet, and
governs the other two dogs; this piece so connected with the dogs
slides on the straight piece as the carriage is moved an end (the straight
piece being confined to the carriage) until it slips off the end of the
straight piece, and lets the piece above connected with it and the
dog fall into the blank or space in the small wheel on the first mention-
ed cylinder, to let the dog take one tooth in the rag wheel, and rising
again by the small wheel revolving around is catched on the straight
piece, and held up until the row of wire is full and then slips off
the other end, continues to operate in the same manner until it

170

1112 continued card or sheet is completed or has the complement of wire set in, two or more cards or sheets may be set at the same time in the same machine by the addition of a former to each sheet or card.

Witnesses present at signing
Robt. Abraham
Thomas Edwards

Aaron Whittemore

Clerk to Mr. J.

E. 30 lines. E (Drawing)

(Rec'd & Recorded Mon. 3rd June 1852)